United States Patent
Shipman et al.

(10) Patent No.: US 9,917,455 B1
(45) Date of Patent: Mar. 13, 2018

(54) CHARGING UNIT AND SYSTEM FOR AT LEAST ONE ELECTRONIC DEVICE

(71) Applicant: TECH FRIENDS, INC., Jonesboro, AR (US)

(72) Inventors: Bob Shipman, Jonesboro, AR (US); Bryan Taylor, Bono, AR (US); Jason Cochran, Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 168 days.

(21) Appl. No.: 14/869,592

(22) Filed: Sep. 29, 2015

(51) Int. Cl.
*H01M 10/46* (2006.01)
*H02J 7/00* (2006.01)

(52) U.S. Cl.
CPC .......... *H02J 7/0044* (2013.01); *H02J 7/0045* (2013.01); *H02J 7/0052* (2013.01); *H02J 2007/0062* (2013.01)

(58) Field of Classification Search
CPC ........ H02J 7/0013; H02J 7/1423; H02J 7/355; H02J 7/0042
USPC .... 320/107, 110, 114, 115, 116; 429/96, 97, 429/98, 99, 100; D13/107
See application file for complete search history.

(56) References Cited

U.S. PATENT DOCUMENTS

| | | | | |
|---|---|---|---|---|
| 2008/0019082 A1* | 1/2008 | Krieger | ............... | B60R 11/0241 320/115 |
| 2009/0295328 A1* | 12/2009 | Griffin, Jr. | ............ | H02J 7/0027 320/115 |
| 2010/0102777 A1* | 4/2010 | Sa | ......................... | H02J 7/0044 320/115 |
| 2012/0098493 A1* | 4/2012 | Budike | ................. | H02J 7/0044 320/107 |
| 2013/0154566 A1* | 6/2013 | Emslie | .................. | H02J 7/0044 320/115 |
| 2014/0084865 A1* | 3/2014 | Yeh | ....................... | H02J 7/0003 320/110 |

\* cited by examiner

*Primary Examiner* — Edward Tso
(74) *Attorney, Agent, or Firm* — Schrantz Law Firm, PLLC; Stephen D. Schrantz

(57) ABSTRACT

The charging system charges electronic devices through the use of a charging base. Charging contacts within the charging base contact a charging adapter inserted into a port of the electronic device. The charging contacts of the charging base contact the charging contacts of the charging adapter to charge the device. A housing that partially encloses the electronic device limits the orientations in which the device can be inserted into the charging base. The housing promotes inserting the device into the charging base in a charging orientation that will charge the device.

21 Claims, 13 Drawing Sheets

FIG. 1

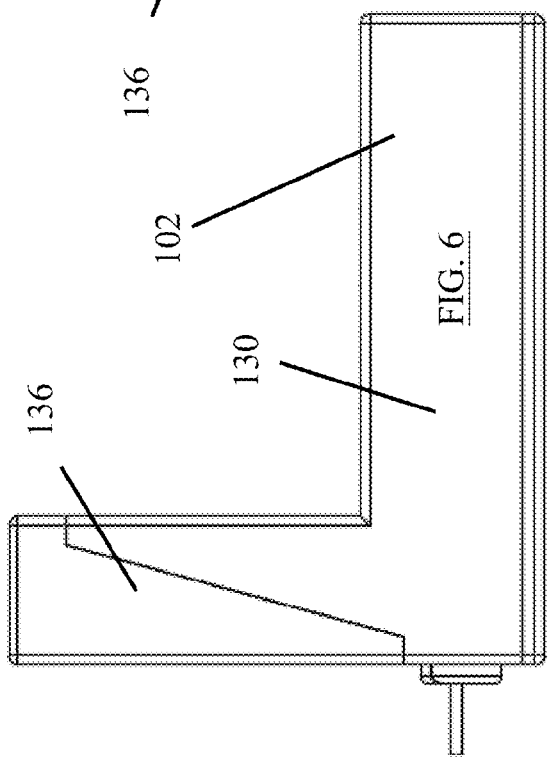

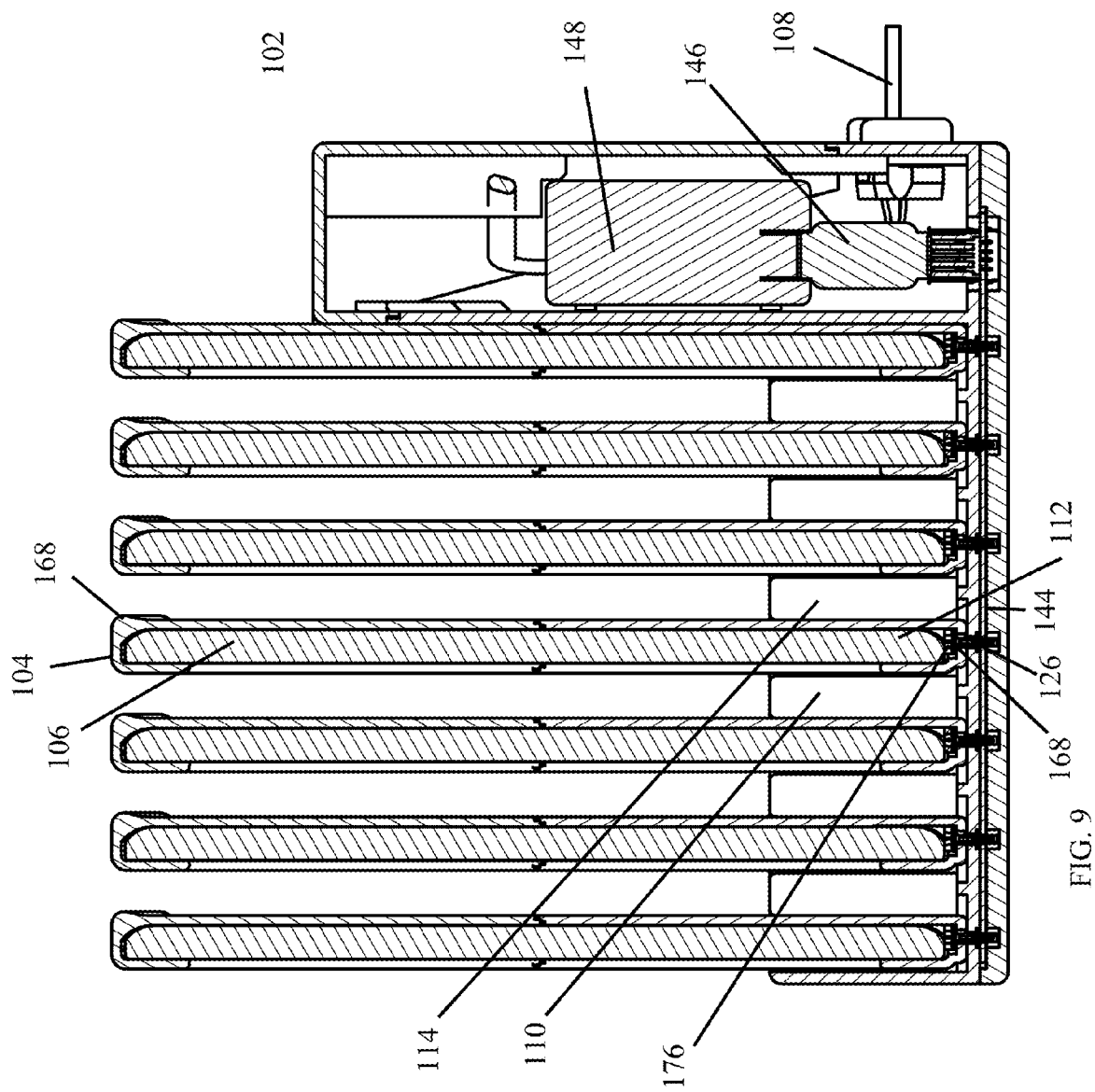

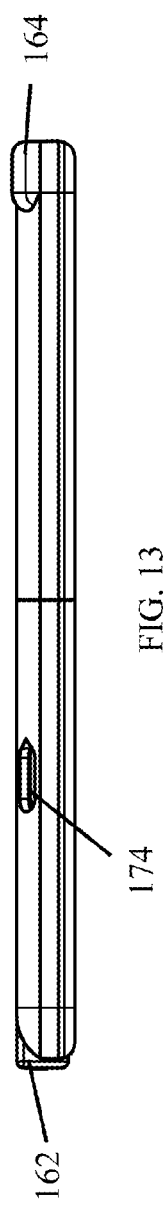
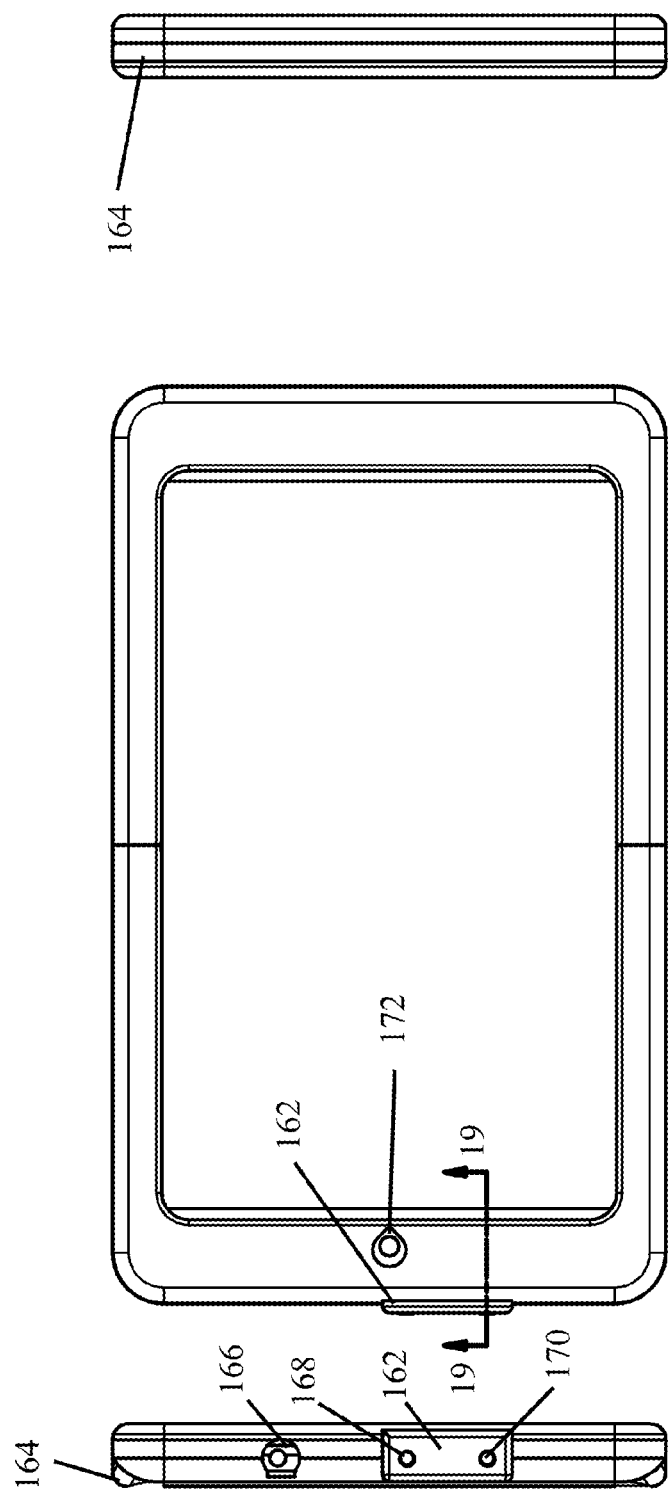
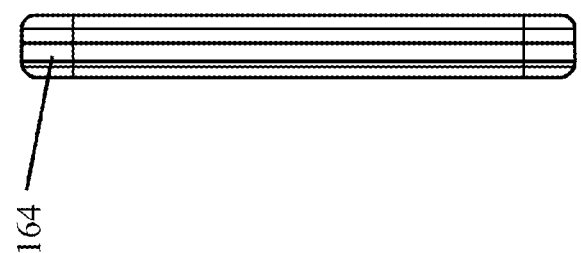
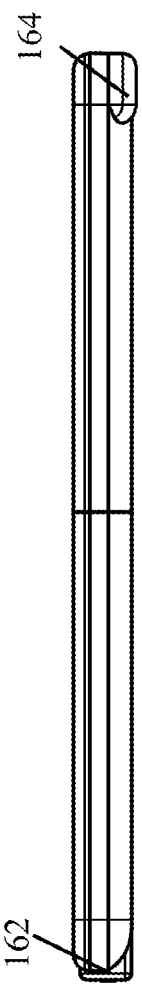
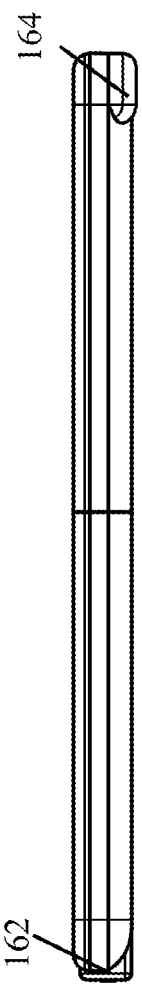
FIG. 13
FIG. 14
FIG. 15
FIG. 16
FIG. 17

CHARGING UNIT AND SYSTEM FOR AT LEAST ONE ELECTRONIC DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to a charging system for charging tablets, smart phones, mobile computing devices, mobile electronic devices, and other electronic devices. The charging system of the present invention simplifies the process of charging the devices by removing the need to insert a plug into the electronic device for charging.

The present invention replaces the traditional cords that are plugged into the device. Instead, the system inserts a charging adapter that provides charging contacts for charging. A charging station is plugged into a power source to supply power to charging contacts within the station. The charging station aligns the charging contacts of the charging adapter with the charging contacts of the charging station. The contact between the charging contacts charges the devices.

The charging station is keyed to accept insertion of the device in a particular orientation. The keying of the charging station prevents users from incorrectly inserting the device into the charging station.

The charging system also provides a protective housing for the device. The housing is keyed to the charging station to orient the device when inserting the device into the charging station. The charging adapter, in one embodiment, is secured within the housing to enable charging of the device.

The housing protects the device from damage. The housing also prevents access to certain features of the device. Eliminating access to these features prevents users from gaining unauthorized access to the device. The housing also prevents users from resetting the device to allow unfettered access to the user.

II. Description of the Known Art

Certain problems exist with the known art. Known housings for tablets and other electronic devices provide unfettered access to the device. Known housings allow access to some buttons and other inputs that can be used to disable certain security features.

With the increase of technology, prisons and jails are providing inmates with access to tablets and other electronic devices. The increased availability of information has provided users with information required to reset the devices and reset the access. Thus, the prisoners can override security features that were previously enabled.

The known systems require either the user to plug in a cord to the device to charge the devices. These cords are expensive. Furthermore, these cords could be used as a weapon in the wrong hands. The present invention eliminates the need for a cord to be plugged into each individual device.

Wireless charging is known. However, such wireless charging requires special devices and chargers for the inductive charging. The present invention provides wireless charging without the need for inductive charging. Therefore, the present invention provides wireless charging at a reduced cost.

Therefore, the present invention is needed to provide a unique charging system that increases safety and reduces costs.

SUMMARY OF THE INVENTION

The present invention relates to a charging system for charging tablets, smart phones, mobile electronic devices, mobile computing devices, and other electronic devices. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The charging system of the present invention simplifies the process of charging the devices by removing the need to insert a plug into the electronic device for charging.

The charging system provides a housing for the electronic device and a charging base designed to receive the housing. The charging base is configured to accept the housing in a set orientation. In one embodiment, retention arms protrude laterally from an interior portion of a first wall and a second wall located opposite the first wall. The retentions arms support the housing when inserted into the charging base.

In one embodiment, the retention arms provide a unique shape to allow insertion of the housing into the charging base in a set orientation. The retention arms of such an embodiment prevent insertion of the housing into the charging base when the housing is oriented in a non-charging orientation. Such a configuration promotes charging of device when inserted into the charging station.

Most devices provide a port for accepting a charger. The charging port may accept USB, USB micro, USB mini, Lightning, or other electrical insertion connection. New connections with new ports will more than likely be developed in the future. A charging adapter of the present invention inserts into the port of the device. The charging adapter can be modified to function with the new ports and electrical insertion connections.

The housing of one embodiment secures the charging adapter within the port. The charging adapter provides two charging contacts for charging the device.

The two charging contacts contact the charging contacts of the charging adapter to complete a circuit when the housing is inserted into the charging base in the charging orientation. Electricity flows from the charging base to the device via the charging contacts.

In one embodiment, the retention arms support the housing and device when the device is inserted into the charging station. The retention arms align the charging contacts of the charging adapter with the charging contacts of the charging base. The device can then charge properly without insertion of a cord into the port. The contact between the charging contacts supply sufficient power to charge the device when the charging base is plugged into a power source.

The power source supplies power to the charging contacts within the base. The charging station is keyed to accept insertion of the device in a particular orientation. The keying of the charging station prevents users from incorrectly inserting the device into the charging station. The retention arms create a retention aperture that accepts the housing in a set orientation.

The retention arms and retention aperture accept the housing in a charging orientation. The housing positioned in the charging orientation aligns the charging contacts. The retention arms prevent insertion of the housing into the charging station in an orientation in which the charging contacts cannot contact each other to transfer electricity to the device.

The charging system also provides a protective housing for the device. The housing is keyed to the charging station to orient the device when inserting the device into the charging station. The charging adapter is secured within the housing to enable charging of the device. Keyed locks or audible alarms could increase the security features of the present invention.

The housing of one embodiment protects the device from damage. The housing may also prevent access to certain features of the device. Eliminating access to these features prevents users from gaining unauthorized access to the device. The housing also prevents users from resetting the device to allow unfettered access to the user.

It is an object of the present invention to charge a mobile electronic device without a cord.

It is another object of the present invention to simplify the process of charging a mobile electronic device.

It is another object of the present invention to reduce the costs associated with charging multiple devices.

It is another object of the present invention to reduce problems associated with charging a mobile electronic device stored within a housing.

It is another object of the present invention to correctly orient the device when inserting the device into the charging station.

It is another object of the present invention to charge multiple mobile electronic devices within a single charging station.

It is another object of the present invention to protect the mobile electronic device within a housing.

It is another object of the present invention to reduce access to the mobile electronic device.

It is another object of the present invention to obstruct buttons on the device to prevent users from accessing certain features of the mobile electronic device.

It is another object of the present invention to key the housing to allow insertion of the housing into the charging station in a charging orientation.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a rear view thereof;

FIG. 6 is a left side view thereof, the right side view being a mirror image of the left side view;

FIG. 7 is a front view thereof;

FIG. 8 is a bottom view thereof;

FIG. 9 is a sectional view of one embodiment of the present invention;

FIG. 13 is a left side view thereof;

FIG. 14 is a bottom view thereof;

FIG. 15 is a front view thereof;

FIG. 16 is a top view thereof;

FIG. 17 is a right side view thereof;

DETAILED DESCRIPTION

Figure 1:
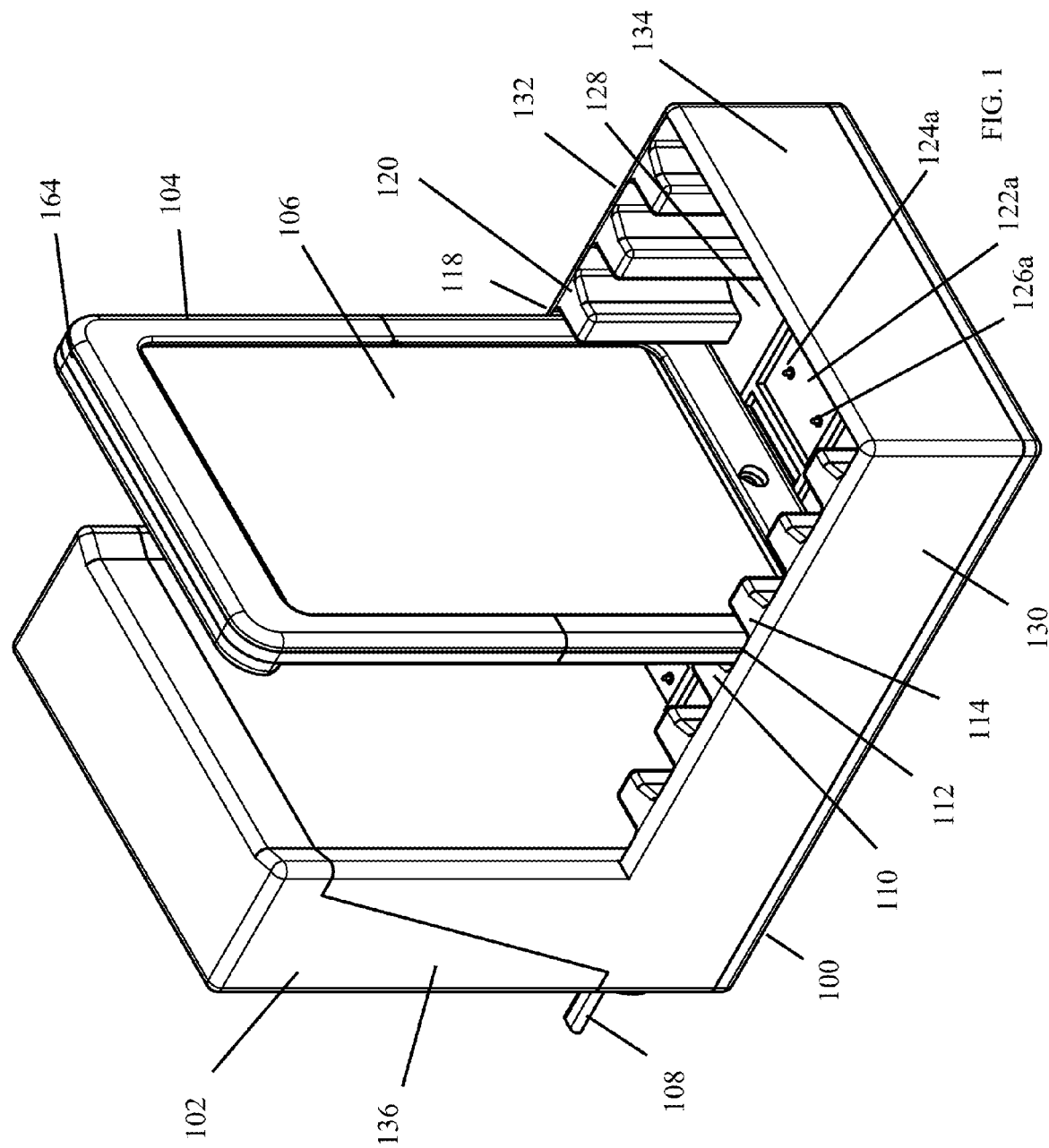
FIG. 1 is an environmental view of one embodiment of the present invention.
Figure 2:
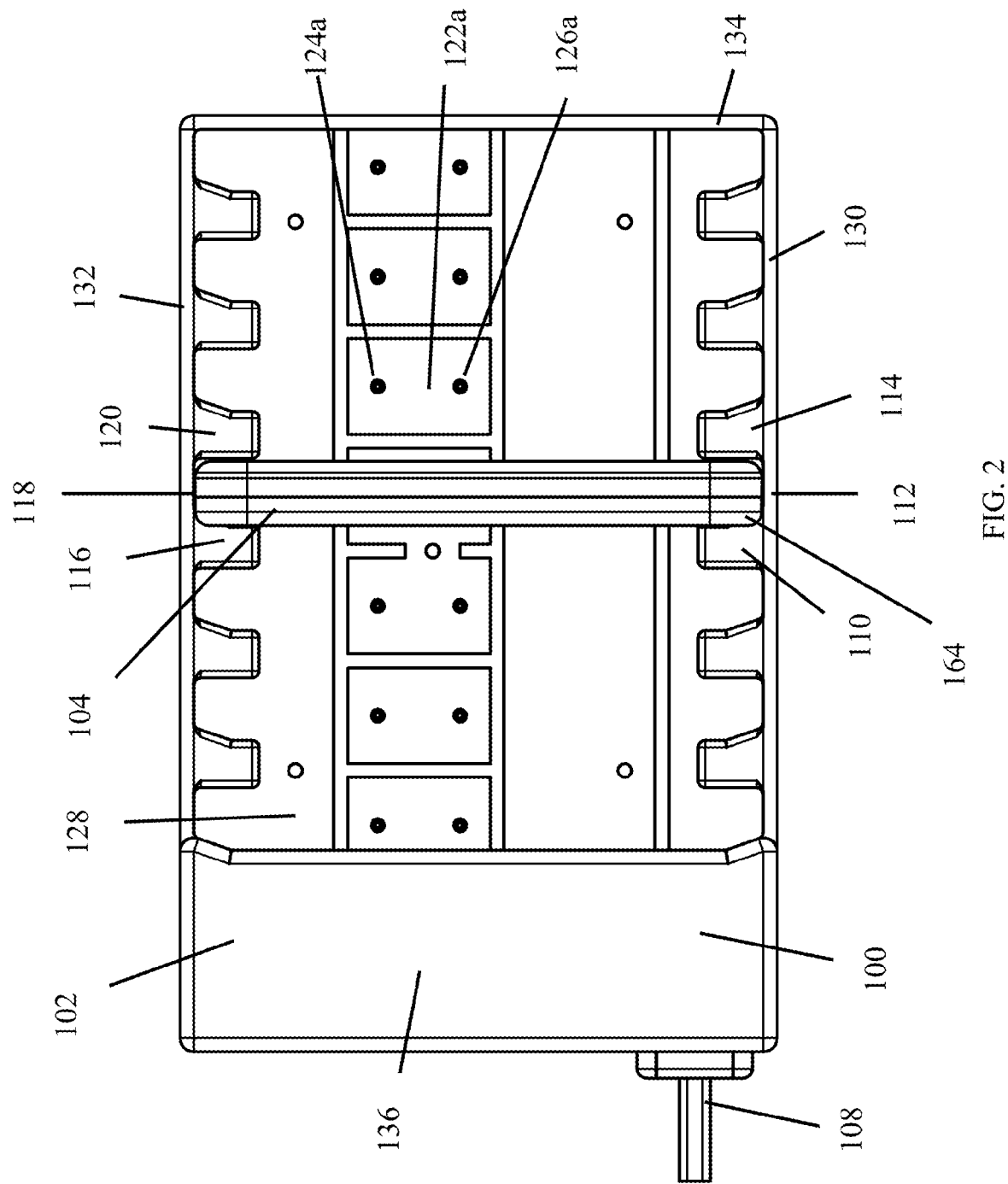
FIG. 2 is an environmental view thereof.

FIGS. 1 and 2 show an environmental view of one embodiment of the charging system 100. The charging system 100 provides a charging base 102 and a housing 104 that at least partially encloses a mobile computing device 106. The present invention has been described as operating for a mobile computing device. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The charging system 100 simplifies the process of charging the devices by removing the need to insert a plug into the port of the device to charge.

Most devices 106 provide a port for accepting a charger. The port may accept USB, USB micro, USB mini, Lightning, or any other electrical insertion connection. A charging adapter of the present invention inserts into the port of the device. The housing secures the charging adapter within the port. The charging adapter provides two charging contacts that provide power to the battery of the device.

The charging system 100 provides a housing 104 for the electronic device 106 and a charging base 102 designed to receive the housing 104. The charging base 102 is configured to accept the housing 104 in a set orientation, preferably a charging orientation. The charging base 102 provides charging contacts that connect to a power source via power cord 108. The charging base 102 accepts housing 104 in a charging orientation that will allow for charging of the device 106.

The charging base 102 aligns charging contacts of the charging adapter with charging contacts of the charging base 102. Insertion of the housing 104 into the charging base 102 in the charging orientation completes the circuit of the charging contacts to charge the device 106.

In one embodiment, retention arms 110, 114, 120 protrude laterally from an interior portion of a first wall 130 and a second wall 132 located opposite the first wall 130. The retentions arms 110, 114, 116, 120 support the housing 104 when inserted into the charging base 102.

In one embodiment, the retention arms 110, 114, 116, 120 provide a unique shape to allow insertion of the housing 104 into the charging base 102 in a charging orientation as shown in FIGS. 1 and 2. The retention arms 110, 114, 116, 120 of such an embodiment prevent insertion of the housing 104 into the charging base 102 in orientations that will not charge device 106. Such a configuration promotes charging of device 106 when inserted into the charging station 102.

The charging base 102 provides at least two charging contacts 124, 126 for contacting the charging contacts of the charging adapter. Electricity flows from the charging base 102 to the device 106 via the charging contacts 124, 126 located within charging aperture 122. The charging aperture 122 of one embodiment is keyed to accept the insertion of at least a portion of the housing 104 where the charging adapter is located.

In one embodiment, the retention arms 110, 114, 116, 120 support the housing 104 and device 106 when the device 106 is inserted into the charging station 102. The retention arms 110, 114, 116, 120 align the charging contacts of the charging adapter with the charging contacts 124, 126 of the charging base 102. The device 106 can then charge properly without insertion of a cord into the port. The contact between the charging contacts supply sufficient power to charge the device 106 when the charging base 102 is plugged into a power source.

The power cord 108 attached to a power source supplies power to the charging contacts 124, 126 within the base. The charging station 102 is keyed to accept insertion of the device 106 in a set orientation, such as the charging orientation. The keying of the charging station 102 prevents users from incorrectly inserting the device 106 into the charging station 102. The retention arms 110, 114, 116, 120 create retention apertures 112, 118 that accept the housing 104 in the charging orientation.

The retention arms 110, 114, 116, 120 and retention apertures 112, 118 accept the housing 104 in a charging orientation. The housing 104 positioned in the charging orientation aligns the charging contacts. The retention arms 110, 114, 116, 120 prevent insertion of the housing 104 into the charging station 102 in an orientation in which the charging contacts cannot complete the circuit to transfer electricity to the device.

The charging system 100 also provides a protective housing 104 for the device 106. The housing 104 is keyed to the charging station 102 to orient the device 106 when inserting the device 106 into the charging station 102. A blocking head 164 of the housing 104 is sized not to be inserted into the receiving apertures 112, 118. In one embodiment, the blocking head 164 may be sized larger than the receiving apertures 112, 118. In another embodiment, the blocking head 164 protrudes from the housing 102 to prevent insertion.

As discussed above, the port of the device 106 is usually located at the bottom of the device 106. The charging adapter and charging contacts of such a device would also be located at the bottom of housing 104 and device 106. To complete the circuit, the charging contacts 124, 126 protrude upward from the floor 128 of the charging base 102. The blocking head 164 of such an embodiment would be located at the top of the housing 104 to prevent insertion of the top of the housing 104 into the charging stations 102.

The charging station 102 provides four walls, walls 130, 132, 134, 136. The walls 130, 132, 134, 135 provide sufficient space between the walls for insertion of the housing 104 into the charging station 102 in the charging orientation.

Figure 3:
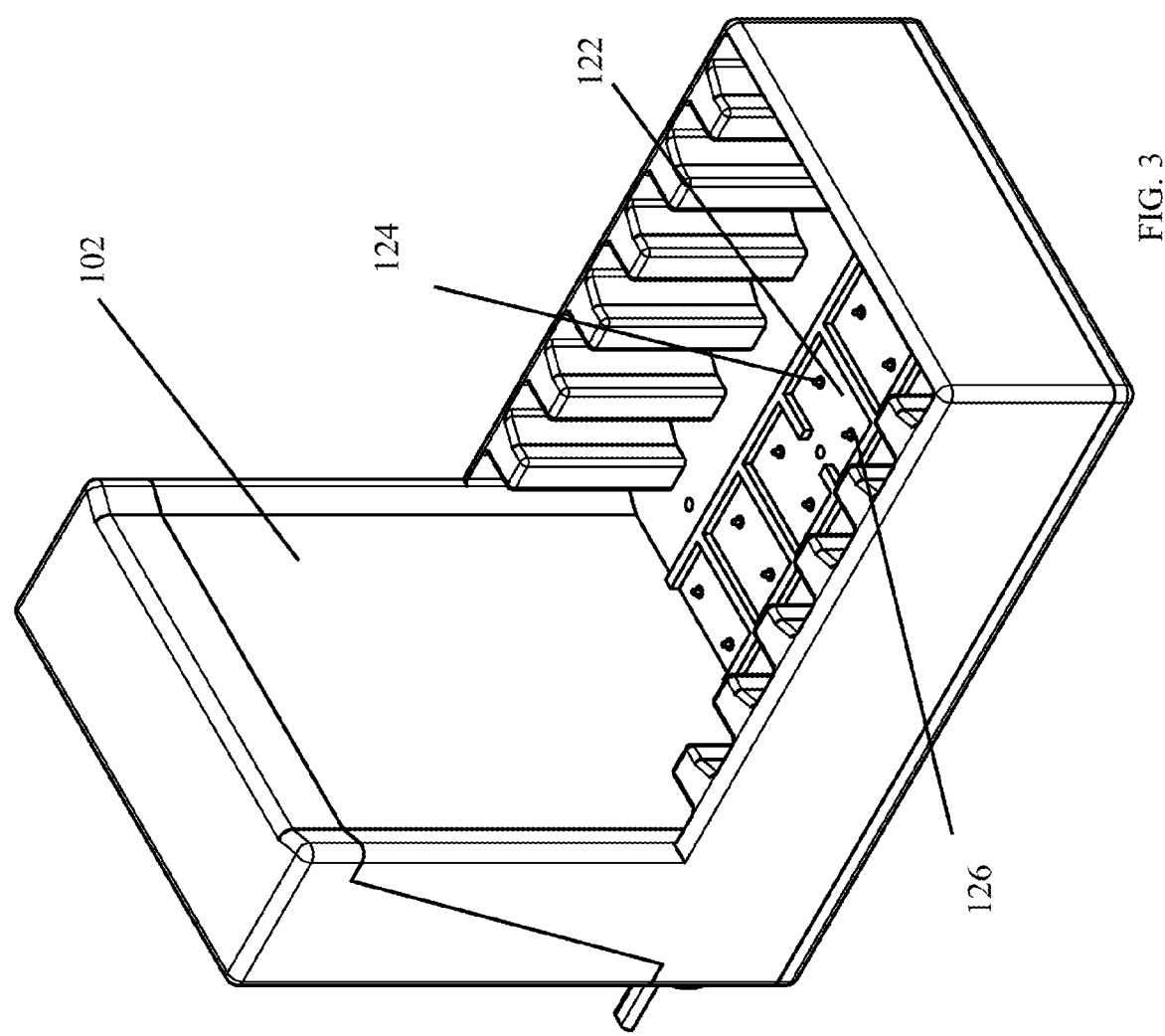
FIG. 3 is a perspective view of the charging station of one embodiment of the present invention.
Figure 4:
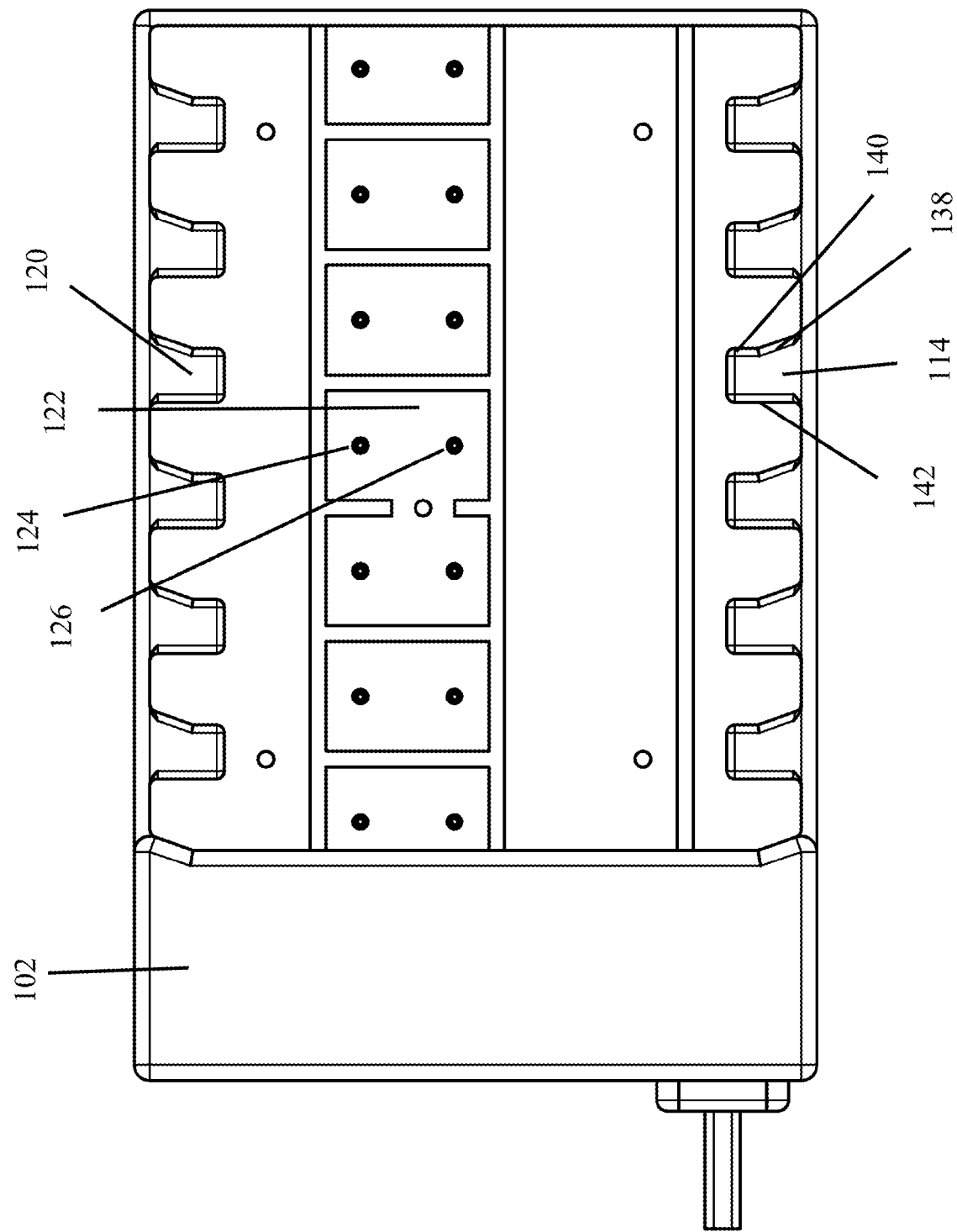
FIG. 4 is a top view thereof.

FIGS. 2-4 show the keying of the housing 104 with receiving apertures 118, 120. A bottom portion of the housing 102 is inserted into the receiving apertures 112, 118 between retention apertures 110, 114, 116, 120. Charging contacts 124, 124a, 126, 126a at charging aperture 122, 122a are exposed through the floor 128 of the charging base 102.

Blocking head 164 is sized not to pass into receiving apertures 118, 120. As shown in FIG. 2, blocking head 164 is larger than receiving apertures 118, 120. Retention arms 110, 114, 116, 120 provide a retention elbow 138, a retention finger 140, and retention back 142. Retention elbow 138 angles into the receiving aperture 118, 120 to reduce the size of the receiving apertures 118, 120. The receiving apertures 118, 120 narrow at the retention elbow 138. The reduced size of the receiving apertures 118, 120 prevents insertion of the blocking head 164 into the receiving apertures 118, 120.

FIGS. 5-8 show different views of the charging base 102. Walls 120, 132, 134, 136 define the area in which the housings may be stored. In one embodiment, power cord 108 secures to the power source for charging the devices.

Figure 10:
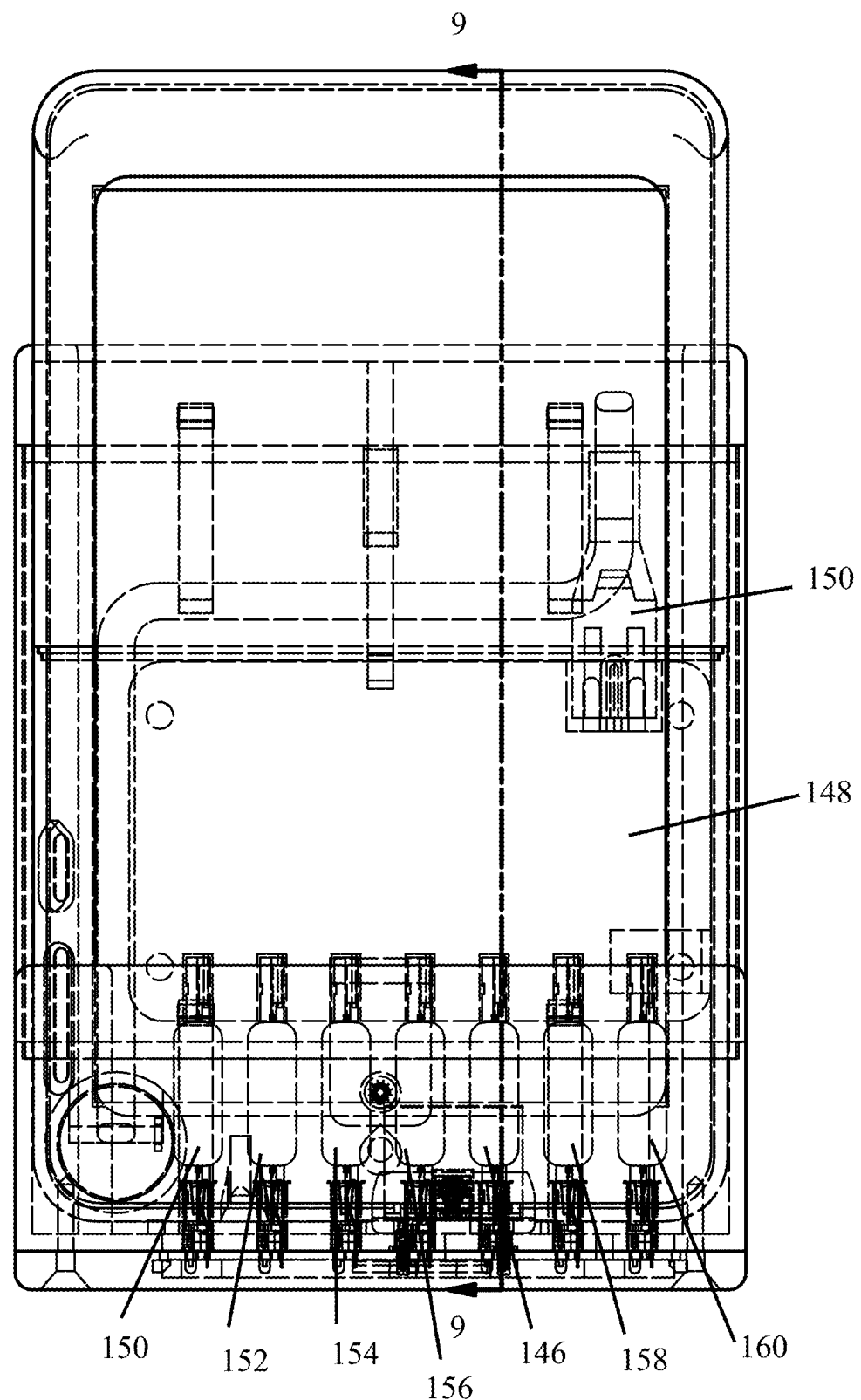
FIG. 10 is a sectional view thereof.

The charging station 102 houses the conductors and adapters needed to charge the devices as shown in FIGS. 9 and 10. The charging station 102 accepts multiple devices 106 and housings 104 for charging multiple devices 106 at a time. FIG. 9 emphasizes the fact that blocking head 168 protrudes outward to prevent insertion of the blocking head 164 into receiving aperture 112.

The retention fingers 110, 114 direct the charging adapter 174 within housing 104 towards charging contacts 126. Charging contacts 168 of charging adapter 174 complete the circuit with charging contacts 126 of the charging base 102. Completing the circuit charges the devices 106 when the charging base 102 is connected to a power source.

Conductor 144 connects the charging contacts 126 with adapter 146, such as a male to male USB adapter. Adapter 146 is inserted into charger 148 which is a multiport USB charger. Power cord 108 supplies power to charger 148 which transfers power to adapter 146. The electricity then flows through conductor 144 and charging contacts 126 to charging adapter 176.

Figure 11:
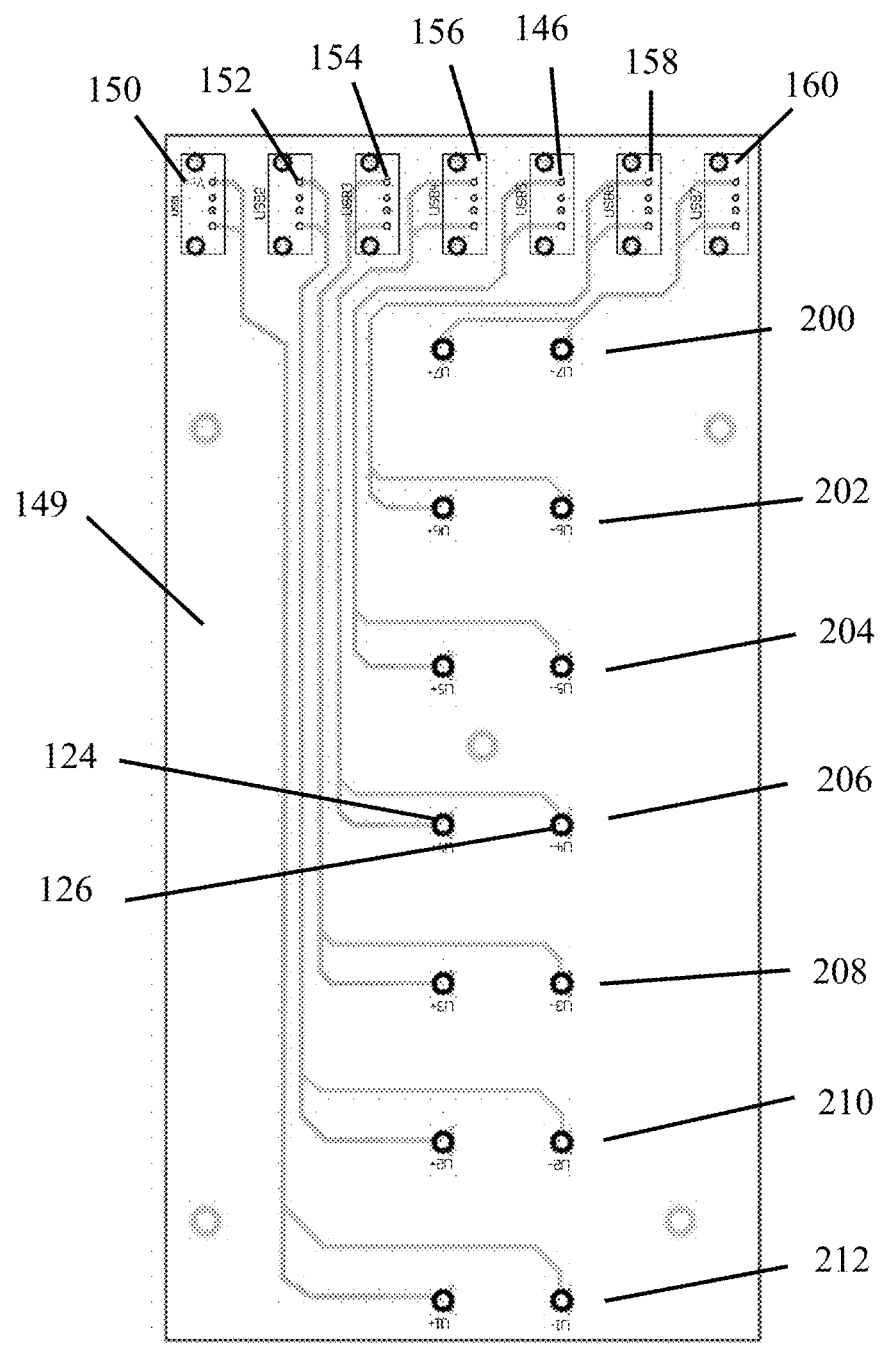
FIG. 11 is a schematic view of one embodiment of the present invention.
Figure 12:
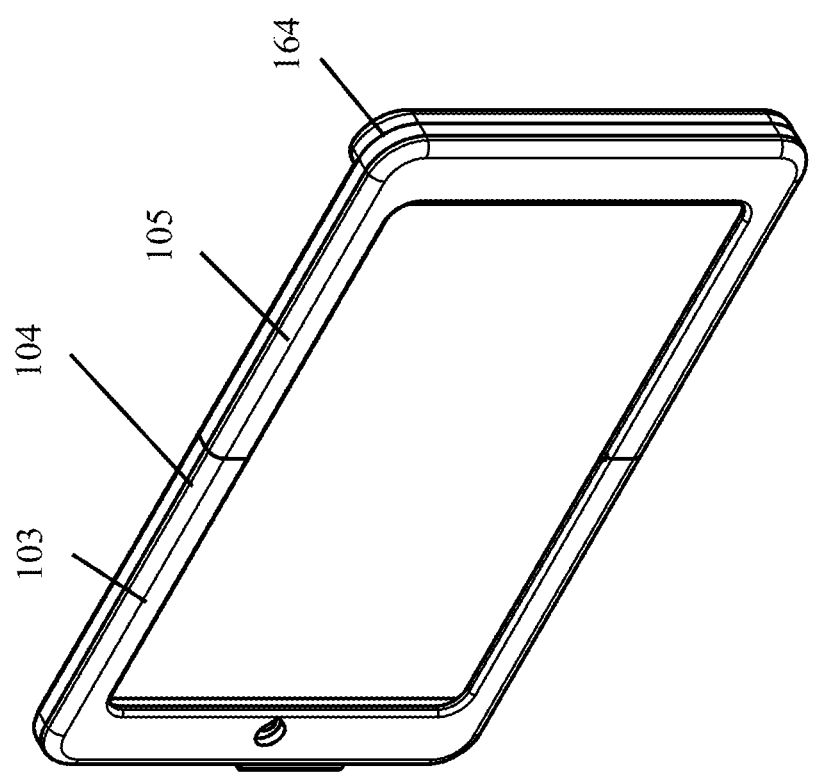
FIG. 12 is a perspective view of a housing of one embodiment of the present invention.
Figure 18:
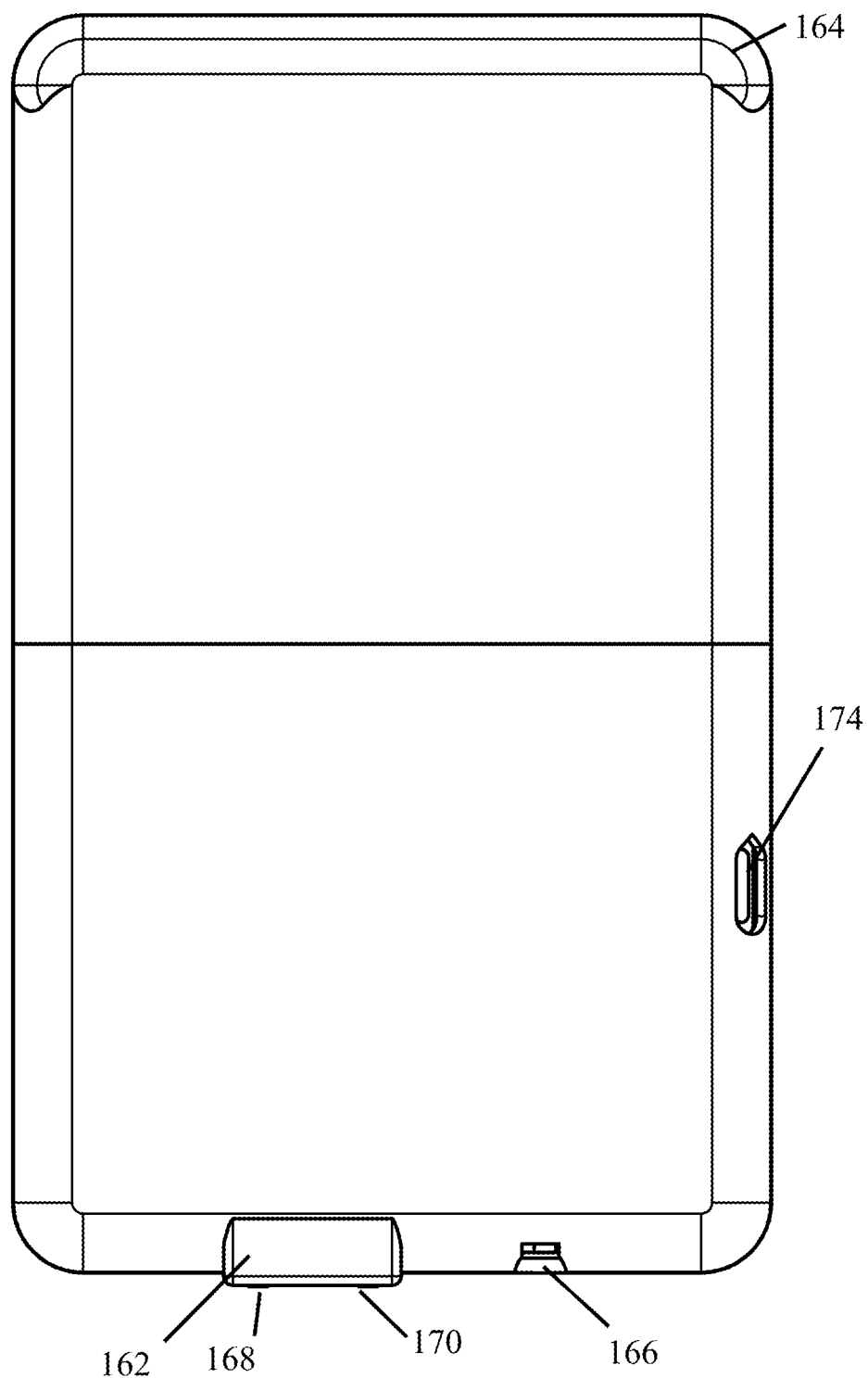
FIG. 18 is a rear view thereof.

FIGS. 10-11 show the connection of adapters 146, 150, 152, 154, 156, 158, 160 into the charger 148. Power cord 150 plugs into charger 148. Each adapter 146, 150, 152, 154, 156, 158, 160 attaches to conductors that supply power to charging contacts 124, 126.

As shown in FIG. 11, conductors connect each adapter 146, 150, 152, 154, 156, 158, 160 to sets of charging contacts 200, 202, 204, 206, 208, 210, 212. Each adapter 146, 150, 152, 154, 156, 158, 160 attaches to two conductors which attach to each charging contact of the set of charging contacts. Each set of charging contacts 200, 202, 204, 206, 208, 210, 212 provides a charging contact similar to charging contacts 124, 126. The set of charging contacts 200, 202, 204, 206, 208, 210, 212 complete an electric circuit with the charging adapter to charge the device.

FIGS. 12-18 show the housing 104 that at least partially encloses the device. The housing of one embodiment provides a lower body 103 and an upper body 105. The housing of other embodiments may be constructed from a variation of other designed pieces to at least partially encase the device. The housing 104 protects the device 106 from damage. The housing 104 also prevents access to certain features of the device 106. Eliminating access to these features prevents users from gaining unauthorized access to the device 106. The housing 104 also prevents users from resetting the device 106 to allow unfettered access to the user.

In one embodiment, the housing is constructed from a rigid material. A shock absorbing material may be added to the housing to provide additional support. In one embodiment, the housing is constructed from a hard plastic. The housing could also be constructed from aluminum or other metal. The housing is constructed from a material that will adequately protect the device. The housing of one embodiment is also constructed from material sufficient to prevent access to some features of the device.

The housing 104 of one embodiment is designed to be tamper proof. While certain housings and cases are designed to be removed and reinstalled, the housing 104 of one embodiment is designed to be difficult to remove. The lower body 103 and upper body 105 are secured to each other with an adhesive or welded together to deter removal of the housing 104.

If a user removes the housing 104, the users will recognize that the housing has been removed. The users can then reset the device to the appropriate settings and reattach the housing 104.

As discussed above, blocking head 164 protrudes outward from the housing. In such an embodiment, the top of the housing 104 has a larger surface area then that bottom of the housing. The housing provides apertures 166, 172, 174 that enable access to the device 106. In one embodiment, apertures 166, 172, 174 provide access to such features as the power button, audio output, and the camera. Aperture 166 provides access to the line out port for audio output. Aperture 172 provides access to the camera. Aperture 174 provides access to the power button.

The housing of one embodiment blocks buttons, inputs, and other access to the device. Some tablets and mobile computing devices allow a user to access particular features through such buttons and inputs. Limiting access to such buttons and inputs prevents users from reconfiguring the device or otherwise accessing disables features of the device. The housing may block such buttons as the windows button and the volume controls. The housing may also block such inputs such as the charging/communication port and the storage slots that allow a user to increase the storage capacity of the device.

Foot 162 of housing 104 is keyed to fit within charging aperture 122. Foot 162 aligns charging contacts 168, 170 with charging contacts 124, 126. As discussed above, aligning charging contacts 124, 126, 168, 170 completes the circuit to allow charging of the device.

Figure 19:
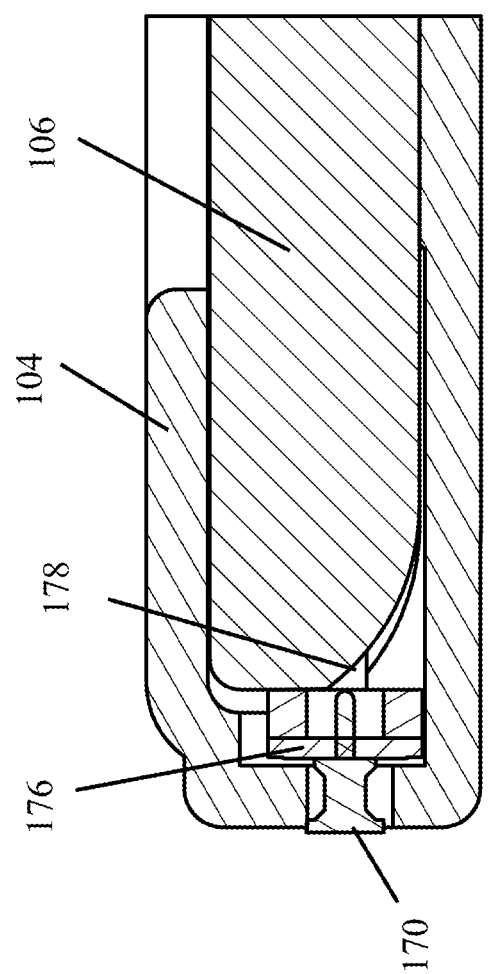
FIG. 19 is a sectional view thereof.
Figure 20:
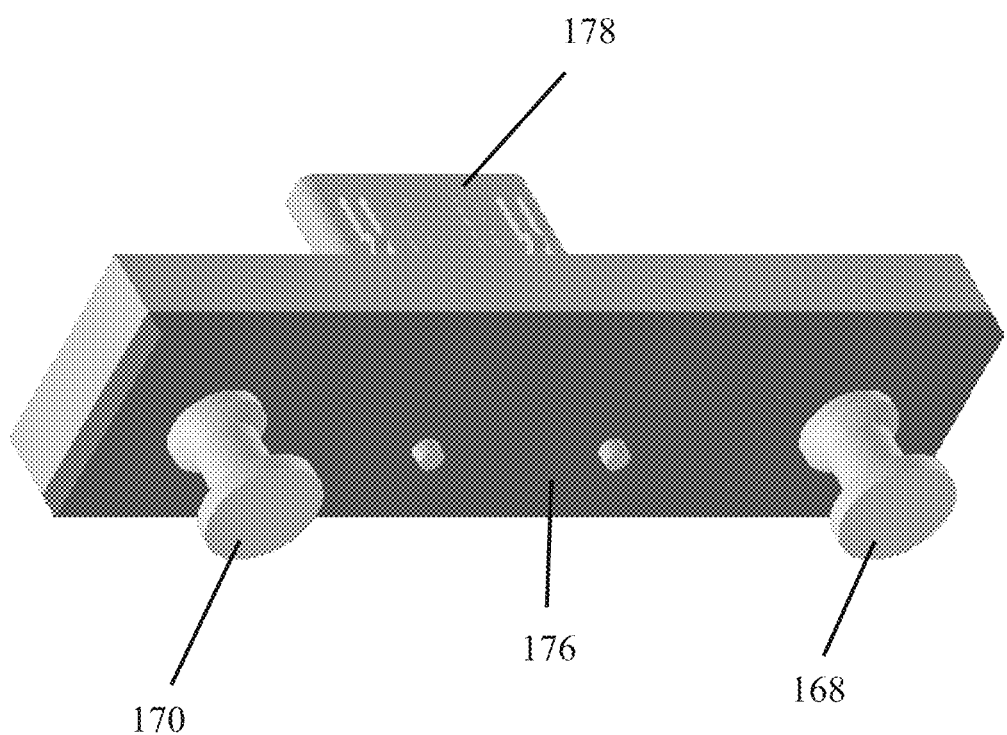
FIG. 20 is a perspective view of a charging adapter of one embodiment of the present invention.

FIGS. 19 and 20 show the charging adapter 176 and securing the charging adapter 176 within device 106. The charging adapter 176 is secured within the housing 104 to enable charging of the device. Male plug 178 inserts into the port of the device 106. Charging contacts 168, 170 of the charging adapter 174 extend into an aperture of the housing 104. The aperture of the housing enables the charging contacts 124, 126, 168, 170 to complete the circuit for charging the device 106.

The charging contacts and orientations have been shown in one manner. The placement of the charging contacts may vary according to the placement of the port and the size of the station. The charging station may be configured to accept the electronic device in other orientations that will allow for charging of the device.

The charging station may also serve as storage of the devices. The devices may be placed into the charging station and then locked within the charging station. Locking the devices in the charging station prevents unauthorized access and securely stores the devices within the charging station.

The charging station may also be implemented as a mobile charging station. Wheels may be attached to the charging station to assist with transporting the devices and the charging station. The wheels increase the mobility of the charging station. A handle may also be attached to the charging station for maneuvering the charging station.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for charging a mobile computing device stored within a housing, the housing aligning a charging port of the device with a charging station connected to a power source, the system comprising:
    a receiving aperture of the charging station configured to accept insertion of the housing within the receiving aperture;
    at least one charging contact within the receiving aperture, the charging contact constructed from a conductive material to transfer electricity from the charging station to the device;
    a charging adapter inserted at least partially into the charging port of the device; and
    at least one charging contact of the charging adapter that contacts the charging contact within the receiving aperture, the charging contact of the charging adapter constructed from a conductive material wherein electricity flows from the charging station to the device through the charging contact of the charging adapter.

2. The system of claim 1 further comprising:
    a base of the charging station that supports the housing;
    a first wall of the charging station extending vertically above the base;
    a second wall of the charging station extending vertically above the base, the second wall located opposite the first wall;
    the receiving aperture sized to receive the device, the receiving aperture defined by an interior portion of the first wall and an interior portion of the second wall.

3. The system of claim 2 further comprising:
    a first retention arm protruding inwardly from the interior portion of the first wall towards the receiving aperture;

a second retention arm protruding inwardly from the interior portion of the second wall towards the receiving aperture wherein the first retention arm and the second retention arm define the receiving aperture.

4. The system of claim 3 wherein the first retention arm and the second retention arm accept insertion of the device into the charging station when the device is positioned in a charging orientation, the first retention arm and the second retention arm obstruct insertion of the housing into the charging station when the housing is not positioned in the charging orientation.

5. The system of claim 1 wherein the charging adapter is inserted into the charging port located at the bottom of the device, the device stored within the housing wherein the bottom of the housing provides access to the charging contact of the charging adapter.

6. The system of claim 5 wherein the bottom of the housing inserts into the receiving aperture.

7. The system of claim 6 wherein the top of the housing is sized not to be inserted into the receiving aperture.

8. The system of claim 7 further comprising:
a blocking head located at the top of the housing, the blocking head preventing insertion of the top of the housing into the receiving aperture.

9. The system of claim 1 further comprising:
a USB charger connected to the power source;
a conductor connecting the charging contact of the charging station with the USB charger, the conducted located within the charging station.

10. The system of claim 1 further comprising:
a multiport USB charger connected to the power source;
a first set of charging contacts of the charging station;
a second set of charging contacts of the charging station;
a first USB adapter inserted into the multiport USB charger;
a second USB adapter inserted into the multiport USB charger;
a first conductor connecting the first set of charging contacts of the charging station with the first USB adapter, the first conductor located within the charging station; and
a second conductor connecting the second set of charging contacts of the charging station with the second USB adapter, the second conductor located within the charging station.

11. A system for charging a mobile computer device stored within a housing, the housing aligning a charging port of the device with a charging station connected to a power source, the system comprising:
a receiving aperture of the charging station configured to accept insertion of the housing within the receiving aperture;
at least one charging contact within the receiving aperture, the charging contact constructed from a conductive material to transfer electricity from the charging station to the device;
a charging adapter inserted at least partially into the charging port of the device;
the housing at least partially enclosing the device and the charging adapter, the housing sized to fit within the receiving aperture when the housing is inserted into the receiving aperture in a charging orientation; and
at least one charging contact of the charging adapter that contacts the charging contact within the receiving aperture, the charging contact of the charging adapter constructed from a conductive material wherein electricity flows from the charging station to the device through the charging contact of the charging adapter.

12. The system of claim 11 further comprising:
a base of the charging station that supports the housing;
a first wall of the charging station extending vertically above the base;
a second wall of the charging station extending vertically above the base, the second wall located opposite the first wall;
the receiving aperture sized to receive the housing, the receiving aperture defined by an interior portion of the first wall and an interior portion of the second wall.

13. The system of claim 12 further comprising:
a first retention arm protruding inwardly from the interior portion of the first wall towards the receiving aperture;
a second retention arm protruding inwardly from the interior portion of the second wall towards the receiving aperture wherein the first retention arm and the second retention arm define the receiving aperture.

14. The system of claim 13 wherein the first retention arm and the second retention arm accept insertion of the housing into the charging station when the device is positioned in a charging orientation, the first retention arm and the second retention arm accepting insertion of the housing into the receiving aperture to align the charging contact of the charging adapter adjacent to the charging contact within the receiving aperture;
the first retention arm and the second retention arm obstruct insertion of the device into the charging station when the device is not positioned in the charging orientation.

15. The system of claim 11 wherein the charging adapter is inserted into the charging port located at the bottom of the device, the device and charging adapter stored within the housing wherein the bottom of the housing provides access to the charging contact of the charging adapter wherein the bottom of the housing is sized to be inserted into the receiving aperture.

16. The system of claim 15 further comprising a blocking head located at the top of the housing wherein the blocking head increases the size of the top of the housing to prevent insertion of the top of the housing into the receiving aperture.

17. The system of claim 11 further comprising:
a USB charger connected to the power source;
a conductor connecting the charging contact of the charging station with the USB charger, the conducted located within the charging station.

18. A system for charging a mobile computing device, the system comprising:
a receiving aperture of the charging station configured to accept insertion of the device within the receiving aperture;
a base of the charging station that supports the device;
a first wall of the charging station extending vertically above the base;
a second wall of the charging station extending vertically above the base, the second wall located opposite the first wall;
the receiving aperture sized to receive the device, the receiving aperture defined by an interior portion of the first wall and an interior portion of the second wall;
at least one charging contact within the receiving aperture, the charging contact constructed from a conductive material to transfer electricity from the charging station to the device;

at least one charging contact of the device that contacts the charging contact within the receiving aperture, the charging contact of the device constructed from a conductive material wherein electricity flows from the charging station to the device through the charging contact of the device;

a housing in which the device is stored;

a blocking head of the housing that enlarges the size of the housing to be greater than the receiving aperture wherein the blocking head prevents complete insertion of the housing into the receiving aperture;

wherein the bottom of the housing provides access to the charging contact of the device, the bottom of the housing sized for insertion into the receiving aperture for contacting the charging contact of the device with the charging contact within the receiving aperture.

19. The system of claim 18 further comprising:

a first retention arm protruding inwardly from the interior portion of the first wall towards the receiving aperture;

a second retention arm protruding inwardly from the interior portion of the second wall towards the receiving aperture wherein the first retention arm and the second retention arm define the receiving aperture;

wherein the first retention arm and the second retention arm accept insertion of the device into the charging station when the device is positioned in a charging orientation to align the charging contact of the device adjacent to the charging contact within the receiving aperture; and the first retention arm and the second retention arm obstruct insertion of the device into the charging station when the device is not positioned in the charging orientation.

20. The system of claim 19 further comprising:

a charging port of the device that accepts a connector;

a charging adapter inserted at least partially into the charging port of the tablet wherein the housing at least partially encloses the charging adapter, the housing securing the insertion of the charging adapter into the charging port; and at least one charging contact of the charging adapter that contacts the charging contact within the receiving aperture, the charging contact of the charging adapter constructed from a conductive material wherein electricity flows from the charging station to the tablet through the charging contact of the charging adapter.

21. A system for charging a first mobile computing device and a second mobile computing device, the system comprising:

a charging station for conducting electricity to the computing devices;

a first receiving aperture of the charging station accepting insertion of the first mobile computing device into the first receiving aperture;

a second receiving aperture of the charging station accepting insertion of the second mobile computing device into the second receiving aperture wherein the charging station simultaneously charges the first mobile computing device inserted into the first receiving aperture and the second mobile computing device inserted into the second receiving aperture;

at least one charging contact within each receiving aperture, the charging contact constructed from a conductive material to transfer electricity from the charging station to the mobile computing device;

a charging adapter of the mobile computing device; and at least one charging contact of the charging adapter that contacts the charging contact within the receiving aperture, the charging contact of the charging adapter constructed from a conductive material wherein electricity flows from the charging station to the device through the charging contact of the charging adapter.

\* \* \* \* \*